US011653364B2

(12) United States Patent
Dai et al.

(10) Patent No.: US 11,653,364 B2
(45) Date of Patent: May 16, 2023

(54) METHODS AND APPARATUS FOR CONFIGURING A SCHEDULING REQUEST

(71) Applicant: ZTE Corporation, Guangdong (CN)

(72) Inventors: Bo Dai, Guangdong (CN); Huiying Fang, Guangdong (CN); Weiwei Yang, Guangdong (CN); Xianming Chen, Guangdong (CN); Kun Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/673,951

(22) Filed: Nov. 4, 2019

(65) Prior Publication Data

US 2020/0068612 A1 Feb. 27, 2020

Related U.S. Application Data

(63) Continuation of application No. PCT/CN2017/083341, filed on May 5, 2017.

(51) Int. Cl.
*H04W 72/23* (2023.01)
*H04W 76/27* (2018.01)
*H04W 72/04* (2023.01)

(52) U.S. Cl.
CPC .......... *H04W 72/23* (2023.01); *H04W 72/04* (2013.01); *H04W 76/27* (2018.02)

(58) Field of Classification Search
CPC . H04W 72/1289; H04W 72/14; H04W 76/27; H04W 28/0278; H04W 72/0413; H04W 72/23; H04W 72/04
See application file for complete search history.

(56) References Cited

U.S. PATENT DOCUMENTS 10,187,878 B2 * 1/2019 Lin .................. H04W 72/23
11,166,302 B2 * 11/2021 Kim ................. H04W 76/27
(Continued)

FOREIGN PATENT DOCUMENTS

| CN | 104170493 A | 11/2014 |
|---|---|---|
| CN | 104244430 A | 12/2014 |
| WO | 2016165387 A1 | 10/2016 |

OTHER PUBLICATIONS

Comparative Performance Study of LTE Uplink Schedulers, Mohamed Salah, Queen's University (Year: 2011).*

(Continued)

*Primary Examiner* — Redentor Pasia
(74) *Attorney, Agent, or Firm* — Perkins Coie LLP

(57) ABSTRACT

A method for providing scheduling request resources to a user equipment involves a wireless network node (e.g., an eNB) transmitting a configuration of scheduling request resources to the user equipment via radio resource control signaling, and the wireless network node enabling the scheduling request resources by transmitting a message to the user equipment via physical layer signaling. The message that enables the scheduling request resources may be transmitted as part of an uplink grant or downlink grant. In some implementations, the enabling message maps to one of several sets of scheduling request resources, which the wireless network node has previously communicated to the user equipment via radio resource control signaling. In other implementations, the selection of which set of scheduling request resources is to be enabling is made by the user equipment based on implicit signaling from the wireless node.

24 Claims, 2 Drawing Sheets

(56) References Cited

U.S. PATENT DOCUMENTS

| | | | | |
|---|---|---|---|---|
| 2011/0249581 | A1* | 10/2011 | Jen | H04B 7/0404 370/252 |
| 2011/0321050 | A1* | 12/2011 | Ho | H04W 8/186 718/102 |
| 2012/0044890 | A1* | 2/2012 | Jen | H04L 5/0053 370/329 |
| 2012/0113967 | A1* | 5/2012 | Smith | H04B 1/7143 375/E1.033 |
| 2013/0081026 | A1 | 3/2013 | Malkamaki et al. | |
| 2014/0029584 | A1* | 1/2014 | Qu | H04L 5/0035 370/336 |
| 2015/0245344 | A1* | 8/2015 | You | H04L 1/1861 370/280 |
| 2015/0288503 | A1* | 10/2015 | Earnshaw | H04L 5/14 370/336 |
| 2016/0094996 | A1* | 3/2016 | Xiong | H04W 72/0446 370/329 |
| 2016/0165541 | A1* | 6/2016 | Camp, Jr. | H04W 72/1278 370/311 |
| 2017/0188352 | A1* | 6/2017 | Lee | H04L 1/1812 |
| 2017/0303241 | A1* | 10/2017 | Yang | H04L 5/0053 |
| 2017/0367058 | A1* | 12/2017 | Pelletier | H04W 52/246 |
| 2018/0063869 | A1* | 3/2018 | Zhang | H04W 74/004 |
| 2018/0077718 | A1* | 3/2018 | Nory | H04W 52/346 |
| 2018/0110066 | A1* | 4/2018 | Luo | H04W 72/0413 |
| 2018/0139764 | A1* | 5/2018 | Hwang | H04W 72/0446 |
| 2018/0220448 | A1* | 8/2018 | Akkarakaran | H04W 16/28 |
| 2018/0262945 | A1* | 9/2018 | Yi | H04W 72/0446 |
| 2018/0263062 | A1* | 9/2018 | Lee | H04W 74/08 |
| 2018/0310308 | A1* | 10/2018 | Loehr | H04W 72/1242 |
| 2019/0124674 | A1* | 4/2019 | Lee | H04W 72/02 |
| 2019/0141731 | A1* | 5/2019 | Yoshimoto | H04W 76/27 |
| 2019/0190669 | A1* | 6/2019 | Park | H04L 5/0094 |
| 2019/0223197 | A1* | 7/2019 | Shin | H04L 1/0031 |
| 2019/0364558 | A1* | 11/2019 | Kim | H04W 72/0453 |
| 2019/0387383 | A1* | 12/2019 | Ye | H04W 4/80 |
| 2020/0022112 | A1* | 1/2020 | Yasukawa | H04W 72/0413 |
| 2020/0029385 | A1* | 1/2020 | Bergström | H04W 76/28 |
| 2020/0288436 | A1* | 9/2020 | Byun | H04L 5/0091 |
| 2021/0282170 | A1* | 9/2021 | Falconetti | H04L 5/0082 |

OTHER PUBLICATIONS

International Search Report and Written Opinion dated Jan. 16, 2018 for International Patent Application No. PCT/CN2017/083341, 6 pages.

\* cited by examiner

US 11,653,364 B2

METHODS AND APPARATUS FOR CONFIGURING A SCHEDULING REQUEST

CROSS REFERENCE TO RELATED APPLICATIONS

This patent document is a continuation of and claims the benefit of priority to International Patent Application No. PCT/CN2017/083341, filed on May 5, 2017. The entire content of the before-mentioned patent application is incorporated by reference as part of the disclosure of this application.

TECHNICAL FIELD

The present disclosure is related generally to scheduling requests in wireless networks and, more particularly, to a method and apparatus for configuring a scheduling request.

BACKGROUND

In current long-term evolution ("LTE") systems, the evolved Node B ("eNB") schedules uplink ("UL") data transmissions for the user equipment ("UE") and allocates radio resources for the UE to use during UL transmission. The UE then transmits UL data using the resources allocated by eNB. Since eNB does not know when the UE has a data transmission requirement, the UE lets the eNB know that it has data to be transmitted by sending a scheduling request ("SR") to the eNB. In response to successfully receiving the request, the eNB allocates resources (e.g., a block in an UL control channel) for the UE to use for the purpose of sending an SR to the eNB and sends information ("SR information") regarding these resources to the UE. To guarantee that other UEs do not interfere, the eNB will pre-allocate SR resources for that particular UE ("UE-specific SR resources"). Meanwhile, the eNB can notify the UE regarding the allocated SR resources and then schedule resources for this UE for UL data transmission.

In current fourth generation ("4G") LTE systems, the eNB periodically reserves SR resources. The eNB configures the UE-specific resources by engaging in radio resource control ("RRC") signaling with the UE. Since the RRC configuration and release procedure are semi-static and the resources cannot be configured dynamically, current 4G LTE systems often incur unnecessary system overhead, especially when the number of users being served by an eNB is large. For a system with limited system bandwidth, the ratio of reserved periodic SR resources to total resources may be relatively higher. This waste of overhead may have significant impact on UL spectral efficiency and UL peak data rate.

DRAWINGS

While the appended claims set forth the features of the present techniques with particularity, these techniques, together with their objects and advantages, may be best understood from the following detailed description taken in conjunction with the accompanying drawings of which:

DESCRIPTION

The disclosure is generally directed to a method and system for configuring SR resources for a UE in a wireless network. According to an embodiment, an eNB configures SR resources for a UE by RRC signaling, but enables or disables the SR resources via physical layer signaling (e.g., via control information in the downlink ("DL") grant or the UL grant) data and/or control information.

Figure 1:
FIG. 1 is a diagram of a system in which various embodiments of the disclosure are implemented.
Figure 1:
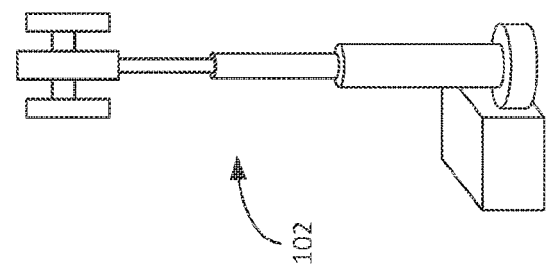

FIG. 1 depicts a wireless communication system 100, which includes an eNB 102 and a UE 104. In an embodiment, the wireless communication system 100 has many components that are not depicted in FIG. 1, including other eNBs, other UEs, wireless infrastructure, wired infrastructure, and other devices commonly found in LTE networks. Example implementations of the eNB 102 include an LTE base station. Example implementations of the UE include any device capable of LTE communication, such as a smartphone, tablet, laptop computer, and non-traditional devices (e.g., household appliances or other parts of the "Internet of Things").

Figure 2:
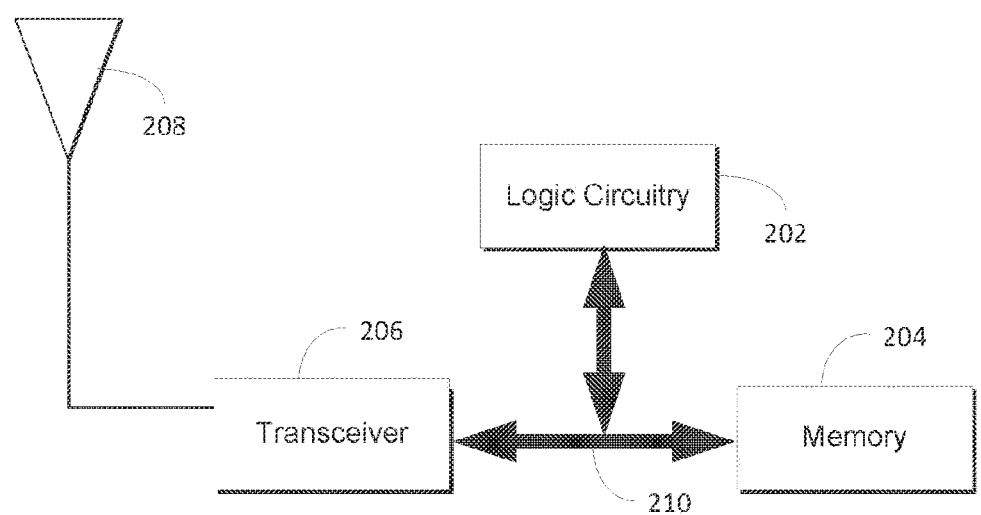
FIG. 2 shows an example hardware architecture, according to an embodiment.

FIG. 2 illustrates a basic (computing device) hardware architecture found in both the eNB 102 and the UE 104, according to an embodiment. The eNB 102 and the UE 104 have other components as well, some of which are common to both and others that are not. The hardware architecture depicted in FIG. 2 includes logic circuitry 202, memory 204, transceiver 206, and one or more antennas represented by antenna 208. Each of these elements is communicatively linked to one another via one or more data pathways 210. Examples of data pathways include wires, conductive pathways on a microchip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Possible implementations of the memory 204 include: volatile data storage; nonvolatile data storage; electrical memory; magnetic memory; optical memory; random access memory ("RAM"); cache memory; and hard drives.

The following description will sometimes refer to an eNB and a UE without specific reference to FIG. 1. It is to be understood, however, that all of the methods described herein may be carried out by the eNB 102 and UE 104, and that references to and eNB and UE in a general manner are merely for convenience. Also, for each of the procedures described, in an embodiment, the steps are carried out in the order that the language sets forth. In other embodiments, the steps are carried out in different orders.

The operation of the eNB 102 and the UE 104 according to an embodiment is as follows The eNB 102 enables or disables the SR resources (i.e., signals to the UE 104 that the UE 104 may start using the SR resources or that the UE needs to cease using the SR resources) by transmitting control information (e.g., 1-bit control information) in a DL Grant message from the eNB to the UE or in an UL Grant message from the eNB to the UE. The eNB configures the SR resources for a UE by RRC signaling (e.g., RRC signaling between the eNB and the UE). In particular, the eNB transmits, via RRC signaling, the SR configuration to the UE (i.e., transmits information regarding what the allocated SR resources are). This SR configuration information includes (in an embodiment) at least one of the following parameters: (a) the period of the SR resources, (b) the starting subframe in each period, (c) resource index for SR transmission in the subframe, (d) the frequency index/subcarrier index for SR transmission, (d) a spreading code index, and (e) the repetition number of the SR (e.g., in coverage-enhanced scenarios).

Approach 1. An example of the eNB 102 configuring SR resources for a target UE 104 by RRC signaling is as follows. The SR configuration information in this example includes: (a) period=T ms, (b) Starting subframe=subframe #S, and (c) resource index for SR transmission in a subframe=X.

Possible ways for the eNB to enable the SR resources in this set of examples include:

The eNB enables/disables SR resources in this example by a 1-bit field in the DL Grant or UL Grant. The 1-bit information is interpreted as shown in Table 1:

TABLE 1

| 1-bit information in DL/UL grant | |
|---|---|
| value | description |
| 0 | Disable |
| 1 | Enable |

According to an embodiment, the eNB enables the SR resources based on one or more criterion. Example of criteria are as follows:

1. When the UE's buffer status report ("BSR"), which the UE transmits to the eNB, is equal to 0, the eNB responds by enabling the SR resource by setting the 1-bit field in the DL grant to value '1' and transmitting the DL grant to the UE.

2. When the eNB 102 anticipates that the UE 104 has finished data transmission, the eNB enables the SR resources by setting the 1-bit filed in DL grant/UL grant to value '1'.

3. When the eNB 102 transmits one or multiple DL data packages, the eNB 102 enables the SR resources by including the 1-bit information in the DL Grant, so that the UE 104 can send SR to the eNB 102, requesting for UL resources for UL message transmission corresponding to DL packages.

4. If the SR can be sent in acknowledgement/negative acknowledgement ("ACK/NACK") resources for the UE 104 with the DL data, when eNB 102 has no more DL data to transmit, the eNB 102 enables the SR resources by setting the 1-bit field in the last DL Grant or the last several DL Grant(s) to the value '1' so that the UE 104 can send the SR even if the eNB has no ACK/NACK resources.

According to an embodiment, the SR resources that the eNB configures by RRC signaling can be dedicated SR resources or contention-free narrowband physical random access channel ("NPRACH") resource. By utilizing contention-free NPRACH resource, the UE 104 can use the contention-free NPRACH signal to transmit an SR message to the eNB. In this case, the eNB 102 will not transmit random access response ("RAR") message but send UL Grant to the target UE. This is true for Approach 1 as well as for the other approaches described herein.

In an embodiment, when the eNB 102 enables the 1-bit field in the DL Grant or the UL Grant, this field stays enabled in the subsequent DL grant or UL Grant transmission. After the eNB 102 receives the SR from the UE 104, the eNB 102 will send an UL Grant to the UE 104 for UL data scheduling; In this case, the 1-bit field in the UL Grant is disabled.

After the UE 104 transmits an SR and receives an UL Grant from the eNB 102, the UE 104 will assume that the SR resources are invalid for SR transmission. The SR resources can be used only when they are enabled again by other DL/UL Grant.

Approach 2. In an embodiment, the eNB 102 configures SR resources for the UE 104 by RRC signaling, but indicates the set of SR resources and the enable/disable status of the SR resources through the use of control information in DL Grant or UL Grant. The configuration of SR resources includes valid time duration, after trigger, and/or one of the following parameters: (a) the starting subframe in each period, (b) resource index for SR transmission in the subframe, (c) frequency index/subcarrier index for SR transmission, (d) spreading code index, and (e) repetition number of SR.

According to an embodiment, the eNB 102 configures multiple sets of SR resources for the UE 104 and indicates those resources via RRC signaling. For example, there could be three sets of resources, such as:

Set #1: period=T1, starting subframe=subframe S1, SR index in the subframe=X1, repetition number of SR=R1

Set #2: period=T2, starting subframe=subframe S2, SR index in the subframe=X2, repetition number of SR=R2

Set #3: period=T3, starting subframe=subframe S3, SR index in the subframe=X3, repetition number of SR=R3;

In another example, the three sets of resources are:

Set #1: period=T11, starting subframe=subframe S11, SR index in the subframe=X11

Set #2: period=T22, starting subframe=subframe S22, SR index in the subframe=X22.

Set #3: period=T33, starting subframe=subframe S33, SR index in the subframe=X33.

In still another example, the three sets of resources are:

Set #1: period=T111, starting subframe=subframe S111, SR index in the subframe=X111, repetition number of SR=R111, valid time duration=T100.

Set #2: period=T222, starting subframe=subframe S222, SR index in the subframe=X222, repetition number of SR=R222, valid time duration=T200.

Set #3: period=T333, starting subframe=subframe S333, SR index in the subframe=X333, repetition number of SR=R333, valid time duration=T300.

According to various embodiments, one motivation for having multiple sets of SR resources is to have multiple options. These options might vary in some predetermined way. Examples of this include:

(a) The period in each set may be different. For example, the unit of period of each set can be different, so the period of Set #1 might be in units of 2 symbols, the period of Set #2 might be in units of one slot, and the period of Set #3 might be in units of one subframe.

(b) Each configuration set of SR resource may have the same period but a different starting subframe.

(c) Each configuration set of SR resource has the same period and same starting subframe but with different resource index.

(d) Each configuration set of SR resource corresponds to one or multiple beamforming(s). For example, configuration Set #1 corresponds to beamforming #1 and configuration Set #2 corresponds to beamforming #2 while Configuration Set #3 corresponds to beamforming #3.

(e) Different configuration sets have different delay requirement. For example, one of the three sets could correspond to emergency service, one to normal service and one to moderate service, respectively.

(f) Different configuration sets may correspond to different scenarios. For example, one of the three sets might correspond to transmission scenario only for DL, one to transmission scenario only for UL, and one to transmission scenario for both UL and DL.

(e) Each configuration set might correspond to a different coverage level.

According to an embodiment, the eNB 102 indicates the set of SR resources and the enable/disable status of the SR resources by a 2-bit field in the DL Grant message or the UL Grant message that the eNB 102 sends to the UE 104. The 2-bit field in DL grant or UL grant may map to the different configurations (3 different one, in this case) as shown in Table 2.

TABLE 2

| 2-bit information in DL/UL grant | |
|---|---|
| value | Description |
| 00 | Disabled |
| 01 | Enabled, use configuration set #1 |
| 10 | Enabled, use configuration set #2 |
| 11 | Enabled, use configuration set #3 |

According to various embodiments, an eNB uses one or more criteria to enable SR resources. Example criteria that the eNB could use in order to enable the SR resource are as follows:

(a) When the B SR reported by the UE 104 to the eNB 102 is equal to 0, the eNB 102 enables the SR resource with configuration set #1 by setting the 2-bit filed in DL grant to value '01'.

(b) When the eNB 102 anticipates the UE has finished data transmission, eNB 102 enables the SR resource with configuration set #2 by setting the 2-bit filed in DL grant/UL grant to value '10'.

(c) When the eNB 102 transmits one or multiple DL data packages, the eNB 102 enables the SR resource with configuration set #3 by setting the 2-bit filed in DL grant/UL grant to value '11'; so that the UE can send SR the eNB 102 requesting for UL resources for UL message transmission corresponding to DL packages.

In an embodiment, when the 2-bit field in DL Grant or UL Grant is enabled, this field remains enabled in the subsequent DL Grant or UL Grant transmissions. After eNB receives the SR from the UE, eNB will send an UL Grant to this UE for UL data scheduling, upon which the eNB disables the 2-bit field in the UL Grant.

According to an embodiment, after the UE transmits an SR and receives an UL Grant from the eNB, the UE will assume that the SR resources are no longer valid for SR transmission. The SR resources can then only be used when they are enabled again by the eNB (in a subsequent DL or UL Grant).

In an embodiment, the SR resources configured by RRC signaling can be dedicated SR resources or contention-free NPRACH resource. By utilizing contention-free NPRACH resource, the UE can send contention-free NPRACH signal to transmit SR message. In this case, the eNB will not transmit Random Access Response ("RAR") message but send UL Grant to the target UE.

In an embodiment, the eNB configures seven sets of SR resources by RRC signaling for the target UE, and each configuration set of SR resource corresponds to one or multiple beamforming(s). The set of SR resources and enable/disable status of SR resources are indicated by 3-bit field in the DL Grant or the UL Grant. An example the 3-bit field in the DL grant or the UL grant might map to the different configurations is shown in Table 3.

TABLE 3

| 3-bit information in DL/UL grant | |
|---|---|
| value | Description |
| 000 | Disabled |
| 001 | Enabled, use configuration set #1 |
| 010 | Enabled, use configuration set #2 |
| 011 | Enabled, use configuration set #3 |
| 100 | Enabled, use configuration set #4 |
| 101 | Enabled, use configuration set #5 |
| 110 | Enabled, use configuration set #6 |
| 111 | Enabled, use configuration set #7 |

According to an embodiment, the UE selects a set of SR resources through implicit signaling, such as a physical layer property of the message containing the 'enabled' information, and the selected set of SR resources is enabled or disabled by control information that the eNB includes in the DL Grant or UL Grant. Examples of ways in which implicit signaling may be carried out by way of a physical layer property of the message include: (1) The UE can determine the set of SR resources according to the subframe type of the subframe that carries DL Grant or UL Grant with 'enabled' information. (2) The UE can determine the set of SR resources according to the downlink control channel type that DL Grant or UL Grant with 'enabled' information corresponds to.

In this embodiment, the SR configuration information includes at least one of the following parameters: (a) the period of the SR resources, (b) the starting subframe in each period, (c) resource index for SR transmission in the subframe, (d) the frequency index/subcarrier index for SR transmission, (d) a spreading code index, (e) the repetition number of the SR, and (f) the valid time duration.

An example of how such explicit signaling may be implemented is as follows. The eNB configures two sets of SR resources by RRC signaling for the target UE. The configured two sets of SR resources are:

Set #1: period=T1, starting subframe=subframe S1, SR index in the subframe=X1, repetition number of SR=R1.

Set #2: period=T2, starting subframe=subframe S2, SR index in the subframe=X2, repetition number of SR=R2 where T2>T1.

Set #1 SR resources is for low latency case while Set #2 SR resources is for normal case. In other words, Set #1 is for the low latency case, in which the 'period' is shorter, and Set #2 is for the normal case, in which the 'period' is larger than that of Set #1.

In another embodiment, in which the set of SR resources used by the UE is selected by implicit signaling, and the selected set of SR resources is enabled/disabled by control information in DL Grant or UL Grant, implicit signaling may be carried out by one of the following methods:

(1) The UE determines the set of SR resources according to the subframe type of the subframe carries DL Grant or UL Grant with 'enabled' information. If the subframe carries DL Grant or UL Grant with 'enabled' information is a short TTI subframe, Set #1 SR resources would be selected by the UE. Else if the subframe carries DL Grant or UL Grant with 'enabled' information is a normal subframe, the UE will select Set #2 SR resources.

The UE can determine the set of SR resources according to the downlink control channel type that DL Grant or UL Grant with 'enabled' information corresponds to. If DL Grant or UL Grant with 'enabled' information corresponds to the short physical downlink control channel ("sPDCCH") (short PDCCH, i.e., the PDCCH occupies one OFDM symbol), Set #1 SR resources would be selected by the UE. Else if DL Grant or UL Grant with 'enabled' information corresponds to normal PDCCH (PDCCH occupies multiple orthogonal frequency-division multiplexing ("OFDM") symbols), Set #2 SR resources, with a larger period, would be selected by the UE.

It should be understood that the embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope. For example, the steps of the methods described here could be reordered in ways that will be apparent to those of skill in the art.

What is claimed is:

1. A method for providing scheduling request resources to a user equipment, the method comprising:
    transmitting, by a wireless network node, a configuration of scheduling request resources to the user equipment via radio resource control signaling, wherein the scheduling request resources comprise a plurality of sets of scheduling request resources,
        wherein each set of scheduling request resources includes a period, a starting subframe in the period, a scheduling resource index for a transmission of a scheduling request in a subframe, and a repetition number for the scheduling request,
        wherein each set of scheduling request resources includes a same period and a different starting subframe;
    transmitting, by the wireless network node, a message to the user equipment via physical layer signaling, wherein the transmitting the message comprises, as part of an uplink grant message or as part of a downlink grant message, information indicating the scheduling request resources are enabled or disabled; and
    determining, by the wireless network node, a physical layer property that corresponds to a set of the plurality of sets of scheduling request resources,
        wherein the transmitting the message to the user equipment via the physical layer signaling comprises indicating that the set of the plurality of sets of scheduling request resources is enabled or disabled by the message having the physical layer property.

2. The method of claim 1, wherein the information indicating the scheduling request resources are enabled comprises a single bit in the uplink grant message or the downlink grant message.

3. The method of claim 1, wherein the scheduling request resources is enabled by transmitting the message to the user equipment via the physical layer signaling comprises transmitting the message indicating which of the plurality of sets of scheduling request resources is to be enabled.

4. The method of claim 1, wherein the physical layer property determined by the wireless network node is a type of subframe in which the message is contained.

5. The method of claim 1, wherein the physical layer property determined by the wireless network node is a type of control channel in which the message is contained.

6. The method of claim 1, wherein the configuration of scheduling request resources comprises any one or more of: a frequency index or subcarrier index for the user equipment to use in the transmission of the scheduling request, and a spreading code index.

7. The method of claim 1, wherein the configuration of scheduling request resources comprises a valid time duration that indicates a length of time for which the scheduling request resources will be valid after the scheduling request resources are enabled.

8. The method of claim 1, wherein each of the plurality of sets of the scheduling request resources differs from other sets of the plurality of sets of the scheduling request resources with respect to a resource index to be used for a scheduling request.

9. The method of claim 1, wherein each of the plurality of sets of the scheduling request resources corresponds to a different antenna beamforming configuration.

10. The method of claim 1, wherein each of the plurality of sets of scheduling request resources corresponds to a different wireless coverage level.

11. A method for obtaining scheduling request resources from a wireless network node, the method comprising:
    receiving, from the wireless network node via radio resource control signaling, a configuration of scheduling request resources, wherein the scheduling request resources comprise a plurality of sets of scheduling request resources,
        wherein each set of scheduling request resources includes a period, a starting subframe in the period, a scheduling resource index for a transmission of a scheduling request in a subframe, and a repetition number for the scheduling request,
        wherein each set of scheduling request resources includes a same period and a different starting subframe;
    receiving, from the wireless network node via physical layer signaling, a message indicating that the scheduling request resources are to be enabled or disabled, wherein the receiving the message comprises receiving, as part of an uplink grant message or as part of a downlink grant message, information indicating the scheduling request resources are enabled or disabled;
    determining a physical layer property of the message; and
    determining, based on the determined physical layer property, which set of the plurality of sets of scheduling request resources is to be enabled or disabled.

12. The method of claim 11, wherein the receiving the configuration of the scheduling request resources from the wireless network node via the radio resource control signaling comprises receiving a single bit in an uplink message or in a downlink message, wherein the single bit indicates whether the scheduling request resources are to be enabled.

13. The method of claim 11, wherein the message further indicates which of the plurality of sets of scheduling request resources is to be enabled.

14. The method of claim 11, wherein the physical layer property is a type of subframe in which the message is contained.

15. The method of claim 11, wherein the configuration of scheduling request resources comprises any one or more of: a frequency index or subcarrier index for a user equipment to use in the transmission of the scheduling request, and a spreading code index.

16. The method of claim 11, wherein the configuration of scheduling request resources comprises a valid time duration that indicates a length of time for which the scheduling request resources will be valid after the scheduling request resources are enabled.

17. The method of claim 1, wherein each of the plurality of sets of the scheduling request resources differs from other sets of the plurality of sets of the scheduling request resources with respect to a starting subframe for a scheduling request.

18. The method of claim 11, wherein each of the plurality of sets of the scheduling request resources differs from other sets of the plurality of sets of the scheduling request resources with respect to a starting subframe for a scheduling request.

19. A wireless network node, comprising:
a processor configured to:
transmit a configuration of scheduling request resources to a user equipment via radio resource control signaling, wherein the scheduling request resources comprise a plurality of sets of scheduling request resources,
wherein each set of scheduling request resources includes a period, a starting subframe in the period, a scheduling resource index for a transmission of a scheduling request in a subframe, and a repetition number for the scheduling request, and
wherein each set of scheduling request resources includes a same period and a different starting subframe;
transmit the scheduling request resources by transmission of a message to the user equipment via physical layer signaling, wherein the transmit the message comprises, as part of an uplink grant message or as part of a downlink grant message, information indicating the scheduling request resources are enabled or disabled; and
determine a physical layer property that corresponds to a set of the plurality of sets of scheduling request resources,
wherein the transmit the message to the user equipment via physical layer signaling comprises indicating that the set of the plurality of sets of scheduling request resources is enabled or disabled by the message having the physical layer property.

20. The wireless network node of claim 19, wherein the information indicating the scheduling request resources are enabled comprises a single bit in the uplink grant message or the downlink grant message.

21. The wireless network node of claim 19, wherein the message indicates which of the plurality of sets of scheduling request resources is to be enabled.

22. A wireless communication apparatus, comprising:
a processor configured to:
receive, from a wireless network node via radio resource control signaling, a configuration of scheduling request resources, wherein the scheduling request resources comprise a plurality of sets of scheduling request resources,
wherein each set of scheduling request resources includes a period, a starting subframe in the period, a scheduling resource index for a transmission of a scheduling request in a subframe, and a repetition number for the scheduling request, and
wherein each set of scheduling request resources includes a same period and a different starting subframe;
receive, from the wireless network node via physical layer signaling, a message indicating that the scheduling request resources are to be enabled or disabled, wherein the receive the message comprises receive, as part of an uplink grant message or as part of a downlink grant message, information indicating the scheduling request resources are enabled or disabled;
determine a physical layer property of the message; and
determine, based on the determined physical layer property, which set of the plurality of sets of scheduling request resources is to be enabled or disabled.

23. The wireless communication apparatus of claim 22, wherein the receive the configuration of the scheduling request resources from the wireless network node via the radio resource control signaling comprises receive a single bit in an uplink message or in a downlink message, wherein the single bit indicates whether the scheduling request resources are to be enabled.

24. The wireless communication apparatus of claim 22, wherein the message further indicates which of the plurality of sets of scheduling request resources is to be enabled.

* * * * *